United States Patent Office 3,423,339
Patented Jan. 21, 1969

3,423,339
POLYURETHANE FOAMS UTILIZING AN OXY-
ETHYLATED TALL OIL FOAM STABILIZER
William R. Andrews, Cheshire, and John L. Meehan,
Hamden, Conn., assignors to Olin Mathieson Chemical
Corporation, a corporation of Virginia
No Drawing. Filed July 29, 1966, Ser. No. 568,733
U.S. Cl. 260—2.5                                  10 Claims
Int. Cl. C08g 22/44

ABSTRACT OF THE DISCLOSURE

Oxyethylated tall oil in an amount between about 0.3 and 3.0% by weight of the foam reactants is employed as a foam stabilizer for polyurethane foams.

---

This invention relates to polyurethane foams. More specifically, it relates to the use of oxyethylated tall oil as a foam stabilizer for preparing said foams.

Polyurethane foams have found wide and varied use in industry. For example, rigid foams are used as insulators, and semirigid and flexible foams are used in cushioning and packaging applications.

The preparation of polyurethane foams by the reaction of a compound containing at least two active hydrogen containing groups as determined by the Zerewitinoff method with an organic polyisocyanate in the presence of a blowing agent, an emulsifier or a foam-stablizing agent, and a reaction catalyst is well known. Tall oil and derivatives thereof have been previously utilized in polyurethane foam formulations. Thus, for example, U.S. Patent 3,095,386 describes the preparation of a solidified cellular polyurethane polymer from a reaction mixture containing an organic compound having at least two active hydrogen-containing groups, an organic polyisocyanate, tall oil containing at least about 10 percent resin acids and a blowing agent. Tall oil is used merely as an inert extender, and the preferred foam formulations and examples utilize a foam stabilizer such as a silicone oil.

Tall oil esters have also been employed in the preparation of polyurethane foams, for example, as described in U.S. 3,248,348 and U.S. 3,248,349. The former patent describes a wide variety of tall oil esters, including the reaction product of tall oil and ethylene oxide, which may be used alone or in combination with other hydroxyl-containing compounds, as the active-hydrogen containing compound in the conventional foam process. It is noted that the tall oil ester, since it is the reactive-hydrogen containing compound, is used in stoichiometric quantities, preferably employing a silicone-type foam stabilizer to provide the desired foams. The function of the tall oil ester is similar in U.S. 3,248,349, where the reactive-hydrogen compound is provided by reacting tall oil with a polyhydric alcohol having 5 to 8 free hydroxyl groups. Silicone-based foam stabilizers are also preferred in the preparation of the cellular foams described therein. Thus, in summary, tall oil and derivatives thereof have been previously employed as the active-hydrogen containing compound in the preparation of polyurethane foams.

It is known to utilize silicone-type foam stabilizers in the preparation of a wide variety of polyurethane foams. While satisfactory for many applications, the silicones are expensive, and often do not provide a uniform cell structure, particularly where an oxyethylated polyhydroxy polyether is employed as the active-hydrogen containing compound in the foam formulation.

The principal object of this invention is to provide an improved, economical foam-stabilizing agent for polyurethane foams. Another object of this invention is to provide polyurethane foams having excellent, uniform cell structures. Still another object of this invention is to provide excellent, rigid, closed-cell polyurethane foams from oxyethylated polyhydroxy polyethers.

The foregoing objects are accomplished in accordance with this invention wherein it has been found that oxyethylated tall oil is a surprisingly effective foam-stabilizing agent in the preparation of polyurethane foams. This material controls cell size during foaming and promotes nucleation.

Tall oil is a mixture of fatty and resin acids obtained as a byproduct in the manufacture of cellulose from pine wood. The composition of tall oil and its properties are generally within approximately the following ranges:

| | |
|---|---|
| Specific gravity | 0.95–1.02 |
| Acid No. | 107–180 |
| Fatty acids, percent by weight | 18–70 |
| Resin acids, percent by weight | 10–80 |

When tall oil is reacted with ethylene oxide in the presence of an alkaline catalyst, a nonionic adduct is provided. Although the formula of oxyethylated tall oil cannot be determined with certainty, it is believed that the following general formula represents the structure thereof:

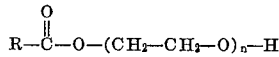

wherein R is alkyl having from 10 to 26 carbon atoms representing the alkyl constituent of the fatty or resin acid and $n$ represents the number of ethylene oxide units in the ester, ranging from about 10 to 20. The oxyethylated tall oil preferred in the process of this invention is a liquid having a specific gravity between 1.05 and 1.10 and a pH (1% solution) between 6.5 and 7.5. The oxyethylated tall oil is provided in a range between about 0.3 and 3.0 percent by weight of the foam reactants, with a range from about 0.5 to 1.5 being preferred. Larger quantities can be employed, but no additional foam stabilization is obtained thereby. If desired, a conventional silicone-type emulsifier can be employed together with the oxyethylated tall oil, but the silicone does not enhance the properties of the foam. Although the oxyethylated tall oil molecule has a free hydroxyl group, it is relatively unreactive with respect to the active-hydrogen containing compound used to prepare the polyurethane foam and furthermore is provided in quantities small enough as to substantially preclude reaction with the organic polyisocyanate. Also, it is generally mixed with the active-hydrogen containing compound prior to addition of the isocyanate, which further diminishes any tendency to react with the isocyanate.

The principal reactants employed in the preparation of polyurethane foams are an active-hydrogen containing compound such as a polyhydroxy polyether and an organic polyisocyanate. Rigid polyurethane foams are generally provided by employing a polyhydroxy polyether having a hydroxyl number between about 175 and 800 as the active-hydrogen containing compound in the previously described reaction. In preparing semirigid foams the hydroxyl number of the polyhydroxy polyether should be between about 75 and about 175, while flexible foams are provided by employing polyhydroxy polyethers having hydroxyl numbers between about 30 and about 60.

Any polyhydroxy polyether usually employed in the preparation of polyurethane foams may be employed in the process of this invention. Exemplificative of these polyhydroxy polyethers are those described in U.S. Patents 3,072,582; 3,095,386; 3,248,348 and 3,248,349. Preferred embodiments of this invention utilize oxyethylated polyhydroxy polyethers, such as oxyethylated mixtures of methyl glucoside with a polyhydric alcohol as described in U.S. 3,167,538, oxyethylated sorbitol, oxyethylated sucrose, oxyethylated mixtures of starch with a polyhydric alcohol, and oxyethylated mixtures of starch with phosphoric acid.

Any of the widely known organic polyisocyanates can be employed in the preparation of the polyurethane foams. An illustrative commercially available isocyanate is toluene diisocyanate, which is a mixture of about 80 percent by weight of 2,4-toluene diisocyanate and about 20 percent of the 2,6-isomer. Other typical exemplificative isocyanates include, but are not limited to, the following: methylene-bis(4-phenyl isocyanate); 3,3'-bitoluene-4,4'-diisocyanate; 3,3'-dimethoxy-4,4'-biphenylene diisocyanate; naphthalene-1,5-diisocyanate; hexamethylene diisocyanate; 1,4-phenylene diisocyanate; polyphenylene polymethylene polyisocyanate; etc. The amount of isocyanate employed in the preparation of the polyurethane foams should be sufficient to provide at least 0.7 NCO group per hydroxyl group present in the reaction system. An excess of isocyanate compound may be conveniently employed; however, this is generally undesirable due to the high cost of the isocyanate compounds. It is preferable, therefore, to employ no greater than about 1.5 NCO groups per hydroxyl group and preferably between about 0.9 and 1.1 NCO groups per hydroxyl group.

The foaming agent employed may be any of those known to be useful for this purpose, such as water, the halogenated hydrocarbons, and mixtures thereof. Typical halogenated hydrocarbons include, but are not limited to, the following: monofluorotrichloromethane; difluorodichloromethane; 1,1,2 - trichloro - 1,2,2 - trifluoroethane; methylene chloride; chloroform and carbon tetrachloride. The amount of foaming agent employed may be varied within a wide range depending on the desired density of the resulting foam. Generally, however, the halogenated hydrocarbons are employed in an amount from 1 to 50 parts by weight per 100 parts by weight of the polyhydroxy polyether, and water can be employed in an amount of from 0.1 to 10 parts by weight per 100 parts by weight of the polyhydroxy polyether.

Any of the catalysts known to be useful in the preparation of polyurethane foams can be employed in this process including tertiary amines, metallic salts and mixtures thereof. Typical tertiary amines include, but are not limited to, the following: 1,1,3,3-tetramethylbutanediamine, N-methyl morpholine, N-hydroxyethyl morpholine, triethylene diamine, triethylamine and trimethylamine. Typical metallic salts include, for example, the salts of antimony, tin and iron, e.g., dibutyl tin dilaurate, stannous octoate, etc. Generally speaking, the catalyst is employed in an amount from 0.1 to 2.0 percent by weight based on the polyhydroxy polyether.

Various additives can be employed which serve to provide different properties, e.g., fillers, such as clay, calcium sulfate, or ammonium phosphate can be added to lower cost and improve specific physical properties. Ingredients such as dyes may be added for color, and fibrous glass, asbestos, or synthetic fibers can be added for strength. In addition, plasticizers, deodorants and antioxidants can be added.

The polyurethane foams of this invention are readily provided by adding a polyisocyanate with stirring to a mixture of a polyhydroxy polyether, oxyethylated tall oil, a blowing agent and a catalyst. The resulting reaction mixture is poured into a mold and allowed to cure. Process conditions such as temperature, pressure, reaction time and order of addition are not critical.

In the preferred embodiments of this invention, rigid, closed-cell polyurethane foams having a uniform cell structure are provided by employing polyhydroxy polyethers having appropriate hydroxyl numbers as the active hydrogen-containing material. Particularly preferred are the oxyethylated polyhydroxy polyethers, which are readily provided by oxyethylating a polyhydroxy material such as sucrose, sorbitol, mixtures of starch with a polyhydric alcohol, mixtures of starch with phosphoric acid and the like. If desired, the polyhydroxy material can be oxyalkylated with another alkylene oxide, such as propylene oxide, butylene oxide, and the like in addition to the reaction with ethylene oxide. Previous attempts to prepare rigid polyurethane foams from these polyhydroxy polyethers have been unsuccessful. Thus, the reaction of oxyethylated polyhydroxy polyethers with isocyanates and blowing agents employing a conventional silicone-type foam stabilizing agent provided foams that either collapsed or blew open shortly after rising. Accordingly, it was particularly surprising and unexpected to obtain such excellent rigid, closed-cell foams from these polyhydroxy polyethers in the process of this invention.

The following examples will serve to illustrate the practice of this invention. All parts and percentages are by weight unless otherwise specified.

EXAMPLE 1

A mixture of water (150 grams), glycerol (92.1 grams) and potassium hydroxide (5.5 grams) was charged to a 3-liter 3-necked flask containing methyl glucoside (777 grams). The reaction mixture was heated to 157–160° C., the water stripped and ethylene oxide (1653 grams) added gradually while maintaining a reaction temperature of about 145° C.

After the addition was completed, the volatiles were stripped at 100° C. and 3 mm. Hg pressure for 1 hour.

The crude polyol was purified with exchange clays and charcoal. After heating at 80° C. for 2 hours, the volatiles were stripped at 110° C., 2 mm. Hg pressure for 1½ hours, the polyol was filtered, and 20 drops of 85 percent phosphoric acid were added to neutralize any excess potassium hydroxide.

The following properties of the resulting polyol were determined:

Hydroxyl No. _____ 424 mg. KOH/gm.
Acid No. _____ 0.05 mg. KOH/gm.
Viscosity _____ 3400 cps. at 25° C.

The cooxyethylated methyl glucoside-glycerol polyol (45.7 percent) was mixed with oxyethylated tall oil (0.9 percent); dibutyl tin dilaurate (1.4 percent) and trichloromonofluoromethane (12.8 percent). The oxyethylated tall oil had a viscosity of 300–500 cps. at 25° C., pH(1% solution, tap water neutralized at pH 7.0) 6.5–7.5, a specific gravity of 1.05–1.10, and contained an average of 16 moles ethylene oxide per mole of oxyethylated tall oil. Crude toluene diisocyanate (39.2 percent) was added to the polyol blend and the resulting mixture stirred vigorously for about 15 seconds and then poured into a rectangular box. Creaming of the foam was observed after 22 seconds and a tack-free, rigid foam was obtained after 35 seconds.

The foam had a density of 2.2 lb./ft.$^3$, a parallel compressive strength of 34 lb./in.$^2$, and approximately 87 percent by volume closed cells.

EXAMPLE 2

Sorbitol (364.4 grams) was charged to a 3-neck 3-liter reaction flask. Heat was applied and the sorbitol melted at 80°–90° C. The temperature was raised to 145° C. and potassium hydroxide (29.9 grams) and ethylene oxide (667 grams) added step-wise to the liquefied sorbitol while maintaining a temperature between about 135° and 145° C.

After purifying with exchange clays and charcoal, the resulting oxyethylated sorbitol polyol was heated for 2 hours at 80° C. and stripped at 110° C. under 2mm. Hg pressure for 2 hours. The polyol was filtered and 4 drops of 85 percent phosphoric acid added to neutralize any excess base.

A foam was prepared from the oxyethylated sorbitol following the procedure of Example 1 and employing the following ingredients:

| | Percent |
|---|---|
| Oxyethylated sorbitol | 47.4 |
| Oxyethylated tall oil (as described in Example 1) | 0.95 |
| Trichloromonofluoromethane | 12.8 |
| Dibutyl tin dilaurate | 1.4 |
| Crude toluene diisocyanate | 37.45 |
| | 100.00 |

A cream time of 23 seconds and a rise and tack-free time of 35 seconds were observed. The resulting rigid foam had a density of 2.5 lb./ft.$^3$ and an excellent closed-cell structure.

COMPARATIVE EXAMPLE

For purposes of comparison a foam was prepared from the oxyethylated sorbitol polyol described in Example 2 utilizing a silicone foam-stabilizing agent. The following reactants were employed:

| | Percent |
|---|---|
| Oxyethylated sorbitol | 45.9 |
| Dibutyl tin diamine | 0.9 |
| DC–201 [1] foam-stabilizing agent | 0.9 |
| Trichloromonofluoromethane | 12.8 |
| Crude toluene diisocyanate | 39.5 |
| | 100.00 |

[1] DC–201 is a silicone foam-stabilizing agent described in U.S. 2,834,748, produced by the Dow Corning Company, Midland, Mich., and has the following general formula:

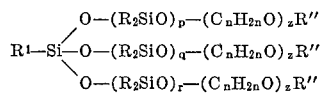

wherein R$_2$, R$^1$ and R'' are C$_{1-8}$ alkyl radicals; $p$, $q$ and $r$ are each 2 to 15 and —(C$_n$H$_{2n}$O)$_z$— is a polyoxyalkylene block which is preferably a polyoxyethylene-polyoxypropylene block containing from 10 to 50 of each oxyalkylene unit.

After creaming, the foam rose and immediately collapsed. This demonstrates that a conventional silicone foam stabilizer is ineffective when oxyethylated sorbitol is employed as the polyol, while Example 2 shows that oxyethylated tall oil is surprisingly effective in this system.

EXAMPLE 3

Sucrose (684 grams) and water (203 grams) were charged to a 2000 ml. three-necked flask. The mixture was heated to 75° C. and boron trifluoride etherate catalyst (2 cc.) and ethylene oxide (376 grams) were added at about 75° C. After the addition was completed, the volatiles, consisting essentially of water, were stripped at 100° C. and 5 mm. Hg pressure for 3 hours.

Additional boron trifluoride etherate (2 cc.) was charged to the reaction mixture, followed by ethylene oxide (500 grams) while maintaining a temperature of about 75° C. Again, the volatiles were stripped at 100° C. under 2 mm. Hg pressure for 1½ hours.

The resulting polyol had a hydroxyl number of 382 mg. KOH/gm., an acid number of 0.5 mg. KOH/gm. and a viscosity of 3300 cps. at 25° C.

A 147 gram portion of the polyol was mixed step-wise with 392 grams of toluene diisocyanate in a 1000 ml. flask, while maintaining a temperature not greater than 70° C., and then cooled to room temperature to provide a polyetherpolyurethane prepolymer.

A foam was prepared from the oxyethylated sucrose polyol and the above-described prepolymer utilizing the following ingredients and following the procedure of Example 1.

| | Percent |
|---|---|
| Oxyethylated sucrose | 42.8 |
| Oxyethylated tall oil (as described in Example 1) | 0.7 |
| Dibutyl tin dilaurate | 0.5 |
| Trichloromonofluoromethane | 12.8 |
| Oxyethylated sucrose polyurethane prepolymer | 43.2 |
| | 100.0 |

The foam was rigid and had an excellent closed-cell structure.

EXAMPLE 4

Boron trifluoride etherate (5 cc.) was added to glycerol (184 grams) in a 2000 ml. 3-necked reaction flask. The mixture was heated to 140° C. and starch (360 grams) added slowly while maintaining a temperature between about 125° and 130° C. The reaction mixture was then heated at 135° C. until the starch was hydrolyzed. Hydrolysis was determined by adding a portion of the reaction mixture to a standard KI–I$_2$ solution; the absence of blue color in the testing solution indicated complete hydrolysis.

Ethylene oxide (207 grams) was added to the reaction mixture while maintaining a temperature of about 135° C. After completion of the addition, the volatiles were stripped at 90° C. under 1 mm. Hg pressure for 2 hours.

Additional ethylene oxide (286 grams) was then added to the stripped reaction mixture while maintaining a temperature of about 135° C. After the addition of the ethylene oxide was completed, propylene oxide (501 grams) was added at the same temperature, and the volatiles were then stripped at 110° C. under 1 mm. Hg pressure for 2 hours. The following properties of the resulting polyol were determined:

| | |
|---|---|
| Hydroxyl No. | 500 mg. KOH/gm. |
| Acid No. | 0.49 mg. KOH/gm. |
| Viscosity | 6,230 cps. at 25° C. |

A foam was prepared from this polyol following the procedure of Example 1 and employing the following reactants.

| | Percent |
|---|---|
| Oxylated starch-glycerol | 42.7 |
| Oxyethylated tall oil (as described in Example 1) | 0.9 |
| Dibutyl tin dilaurate | 0.9 |
| Trichloromonofluoromethane | 12.8 |
| Crude toluene diisocyanate | 42.7 |
| | 100.0 |

A cream time of 24 seconds, a rise time of 95 seconds and a tack-free time of 80 seconds were observed. The resulting rigid foam had a density of 2.1 lb./ft.$^3$, parallel compressive strength of 21 lb./in.$^2$ and an excellent uniform closed-cell structure.

COMPARATIVE EXAMPLE

A foam was prepared for the purpose of comparison from the polyol described in Example 4 and the foam-stabilizing agent described in Comparative Example 1 above.

The following ingredients were employed in the preparation of the foam:

| | Percent |
|---|---|
| Oxylated starch-glycerol polyol | 49.0 |
| DC–201 foam-stabilizing agent | 1.0 |
| Dibutyl tin diamine | 1.0 |
| Trichloromonofluoromethane | 12.7 |
| Crude toluene diisocyanate | 36.3 |
| | 100.0 |

The resulting foam had poor physical properties including extremely large irregular cells, demonstrating the ineffectiveness of silicone foam-stabilizing agents in preparing foams from oxyalkylated starch-glycerol polyols.

As shown in Example 4, excellent foams are provided by employing oxyethylated tall oil as a foam-stabilizer in this formulation.

EXAMPLE 5

Sorbitol (364.4 grams) was charged to a 3-neck flask and melted at 80°–90° C. as in Example 2. Potassium hydroxide (3.3 grams) was added to the liquified sorbitol and the temperature of the reaction mixture raised to 145° C. Ethylene oxide (600 grams), followed by propylene oxide (600 grams) were added to the reaction mixture at a temperature of about 145° C.

The crude polyol was purified with exchange clays and then heated for 2 hours. The volatiles were stripped at 110° C. and 2 mm. Hg pressure for 2 hours, the polyol filtered and 2.6 g. of 85 percent phosphoric acid added. The following properties of the resulting polyol were determined:

Hydroxyl No. _____ 426 mg. KOH/gm.
Acid No. _____ 0.05 mg. KOH/gm.
Viscosity _____ 5,200 cps. at 25° C.

A foam was prepared from the oxyalkylated sorbitol following the procedure of Example 1 and employing the following ingredients:

|  | Percent |
|---|---|
| Oxylated sorbitol | 46.7 |
| Oxyethylated tall oil (as described in Example 1) | 0.9 |
| Dibutyl tin dilaurate | 1.4 |
| Trichloromonofluoromethane | 12.6 |
| Crude toluene diisocyanate | 38.4 |
|  | 100.0 |

Creaming of the foam was observed after 21 seconds. The rise time was 62 seconds and the tack-free time 56 seconds. The foam was rigid, having a density of 2.2 lb./ft.³ and a parallel compressive strength of 26 lb./in.² It had an excellent closed-cell structure.

EXAMPLE 6

A 4:1 molar mixture of methyl glucoside and glycerol was heated in the presence of potassium hydroxide catalyst and then reacted with propylene oxide in accordance with the process described in Example 1 of U.S. Patent 3,167,538.

Following the procedure of Example 1 herein, a foam was prepared from this polyol employing the following ingredients:

|  | Percent |
|---|---|
| Oxypropylated methyl glucoside-glycerol | 40.2 |
| Polyphenylene-polymethylene-polyisocyanate | 44.3 |
| Oxyethylated tall oil | 1.6 |
| Trichloromonofluoromethane | 12.8 |
| 1,1,3,3-tetramethylbutanediamine | 1.1 |
|  | 100.0 |

The oxyethylated tall oil employed in the preparation of this foam had a viscosity of 190 cps. at 95° C., a specific gravity at 77° F. of 1.065–1.070, a pH (0.2% aqueous solution) of 7.2, and contained an average of 14 moles ethylene oxide per mole of oxyethylated tall oil.

Creaming of the foam was observed after 19 seconds. After 100 seconds the foam began to rise and a tack-free foam was obtained after 107 seconds. The foam had a density of 2.1 lb./ft.³ and an excellent uniform closed-cell structure.

EXAMPLE 7

To a nitrogen purged 100 gallon reactor was charged 22.2 lbs. of 85 percent phosphoric acid and 91.7 lbs. of 105 percent phosphoric acid. The reactor was closed and the acid heated to 50° C. Potato starch (52.8 lb.) was added over a period of 15 minutes at about 50° C. The vessel was closed again, heated to 90° C., and then additional potato starch (52.8 lb.) was added.

The reaction mixture was maintained at 90° C. until the starch was hydrolyzed, as evidenced by the absence of blue color in a KI–I₂ testing solution containing a sample of the reaction mixture.

Propylene oxide (520 lb.) was added gradually while maintaining a temperature between about 90° and 100° C., and the mixture was then post-reacted for one hour at 90°–100° C.

The volatiles were stripped at 85°–90° C. and 10 mm. Hg pressure for 3 hours, a diacetal water scavenger added, and the product filtered at 80°–85° C.

The resulting polyol had a hydroxyl number of 485 mg. KOH/gm. and a viscosity of 3272 cps. at 25° C.

A foam was prepared from this polyol following the procedure of Example 1 and employing the ingredients listed below:

|  | Percent |
|---|---|
| Oxypropylated starch-phosphoric acid polyol | 42.7 |
| Oxyethylated tall oil (as described in Example 1) | 1.7 |
| Dibutyl tin dilaurate | 1.3 |
| Trichloromonofluoromethane | 12.8 |
| Crude toluene diisocyanate | 41.5 |
|  | 100.0 |

Creaming of the foam was observed after 33 seconds, the foam began to rise after 90 seconds and a tack-free foam was observed after 72 seconds. The foam had an excellent closed-cell structure.

EXAMPLE 8

Starch (107.25 lb.), 85 percent phosphoric acid (22.12 lb.) and 105 percent phosphoric acid (94.04 lb.) were charged to a 1000 gal. reactor. Heat was applied and the reaction mixture heated at 90° C. for 30 minutes. The temperature was lowered to 70° C. and ethylene oxide (627.0 lb.) added, while maintaining a temperature between 60° and 100° C. The mixture was post-reacted for about 1 hour at 95° C.

The volatiles were stripped at 110° C. and 2 mm. Hg pressure for 2 hours and a diacetal stabilizer (1131 g.) was then added at room temperature.

The resulting polyol had a hydroxyl number of 438 mg. KOH/gm.

A foam was prepared from this polyol following the procedure of Example 1 and employing the following ingredients:

|  | Percent |
|---|---|
| Oxyethylated starch-phosphoric acid polyol | 40.8 |
| Oxyethylated tall oil (as described in Example 1) | 0.6 |
| 1,1,3,3-tetramethylbutanediamine | 0.6 |
| Trichloromonofluoromethane | 12.3 |
| Polyphenylene polymethylene polyisocyanate | 45.7 |
|  | 100.0 |

Creaming was observed after 14 seconds. The foam began to rise and became tack-free after 40 seconds. Its physical properties and cell structure were excellent.

What is claimed is:

1. In a process for preparing a polyurethane foam by reacting a polyhydroxy polyether having a hydroxyl number between 30 and 800 with an organic polyisocyanate in the presence of a blowing agent, a foam stabilizer and a reaction catalyst, the improvement which comprises employing as said foam stabilizer oxyethylated tall oil having a specific gravity between 1.05 and 1.10, a pH (1% solution) between 6.5 and 7.5, and containing about 10 to 20 moles of ethylene oxide per mole of tall oil, said oxyethylated tall oil being employed in an amount between about 0.3 and 3.0 percent by weight of the foam reactants.

2. The product prepared by the process of claim 1.

3. The process of claim 1 in which the oxyethylated tall oil is employed in an amount between about 0.5 and 1.5 percent by weight of the foam reactants.

4. The process of claim 1 in which said polyhydroxy polyether has a hydroxyl number between about 175 and about 800.

5. The product prepared by the process of claim 4.

6. The process of claim 4 in which said polyhydroxy polyether is an oxyethylated polyhydroxy polyether.

7. The product prepared by the process of claim 6.

8. The process of claim 6 in which said oxyethylated polyhydroxy polyether is selected from the group consisting of oxyethylated sorbitol, oxyethylated sucrose, an oxyethylated mixture of starch and a polyhydric alcohol, and an oxyethylated mixture of starch and phosphoric acid.

9. The product prepared by the process of claim 8.

10. The process of claim 1 in which said polyhydroxy polyether is an oxyethylated polyhydroxy polyether, said organic polyisocyanate is selected from the group consisting of crude toluene diisocyanate and polyphenylene polymethylene polyisocyanate, said blowing agent is trichloromonofluoromethane, and said reaction catalyst is selected from the group consisting of dibutyl tin diamine, dibutyl tin dilaurate and 1,1,3,3-tetramethylbutanediamine.

References Cited

UNITED STATES PATENTS

| | | | |
|---|---|---|---|
| 2,950,262 | 8/1960 | Bush et al. | 260—2.5 |
| 2,954,369 | 9/1960 | Karabinos et al. | 260—97.5 |
| 3,002,937 | 10/1961 | Parker et al. | 260—2.5 |
| 3,003,977 | 10/1961 | Hurwitz et al. | 260—2.5 |
| 3,072,582 | 1/1963 | Frost | 260—2.5 |
| 3,095,386 | 6/1963 | Hudson | 260—2.5 |
| 3,248,348 | 4/1966 | Piechota et al. | 260—2.5 |
| 3,248,349 | 4/1966 | Szabat et al. | 260—2.5 |

FOREIGN PATENTS

| | | |
|---|---|---|
| 865,616 | 4/1961 | Great Britain. |
| 874,766 | 8/1961 | Great Britain. |
| 892,776 | 3/1962 | Great Britain. |

JAMES A. SEIDLECK, *Primary Examiner.*

M. J. WELSH, *Assistant Examiner.*